(12) United States Patent
Sourour

(10) Patent No.: US 6,810,070 B1
(45) Date of Patent: Oct. 26, 2004

(54) SELECTIVE MULTI-CARRIER DIRECT SEQUENCE SPREAD SPECTRUM COMMUNICATION SYSTEMS AND METHODS

(75) Inventor: Essam Sourour, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/481,173

(22) Filed: Jan. 12, 2000

(51) Int. Cl.$^7$ ................................................ H04B 1/69
(52) U.S. Cl. ..................................................... 375/140
(58) Field of Search ................................. 375/140, 141, 375/130, 146, 147, 142; 370/332, 232, 235, 237, 315

(56) References Cited

U.S. PATENT DOCUMENTS 6,181,684 B1 * 1/2001 Turcotte et al. ............. 370/332
6,522,706 B1 * 2/2003 Bahai et al. ................. 375/343

FOREIGN PATENT DOCUMENTS

EP          0866577 A2       9/1998

OTHER PUBLICATIONS

Sourour, Essam A. and Nakagawa, Masao, "Performance of Orthogonal Multicarrier CDMA in a Multipath Fadin Channel", IEEE Transactions on Communications, vol. 44, No. 3, Mar. 1996, pp. 356–367.

* cited by examiner

Primary Examiner—Khai Tran
(74) Attorney, Agent, or Firm—Coats & Bennett, P.L.LC.

(57) ABSTRACT

The ratio of the delay spread associated with a selected channel to the chip duration is used to determine the number of resolvable paths per carrier in a communication system. A desired number of paths per carrier for the selected channel may then be determined. Next, a number of carriers corresponding to the desired number of paths per carrier may be allocated to the communication signal. Alternatively, a number of carriers for a given channel may be allocated as a function.

26 Claims, 5 Drawing Sheets

SELECTIVE MULTI-CARRIER DIRECT SEQUENCE SPREAD SPECTRUM COMMUNICATION SYSTEMS AND METHODS

BACKGROUND OF THE INVENTION

The present invention relates to the use of Code Division Multiple Access (CDMA) communication techniques in radio communication systems, and more particularly to systems and methods for selecting the number of carriers for a Direct Sequence Spread Spectrum Multiple Carrier (DS-SS MC) CDMA communication signal using a characteristic of a selected communication channel.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs, to maintain high quality service, and to avoid rising prices.

Throughout the world, one important step in the advancement of radio communication systems is the change from analog to digital transmission. Equally significant is the choice of an effective digital transmission scheme for implementing the next-generation technology. Furthermore, it is widely believed that Personal Communication Networks (PCNs), employing low cost, pocket-sized, cordless telephones that can be carried comfortably and used to access networks to transmit voice, data, and/or video from the home, office, street, car, etc. will be provided by cellular service providers using a digital cellular system infrastructure. An important feature desired in these new systems is increased traffic capacity.

Wireless communication systems transmit communication signals on one or more carrier waves. As used herein, the term "signal" refers to an electrical wave, either analog or digital, that is used to convey information, and the term "communication signal" refers to a signal that conveys user information such as, for example, voice, video, or data information. As used herein, the term "carrier" is used to refer to a radio frequency (RF) wave generated at a transmitting station for the purpose of carrying a signal, which may be a communication signal.

In wireless communication systems, the term "channel" refers to an electromagnetic communication path between a transmitter and one or more receivers. In many existing radio communication systems, channel access is achieved using Frequency Division Multiple Access (FDMA) and Time Division Multiple Access (TDMA) methods. In FDMA, a channel is a single radio frequency band within a given frequency spectrum into which a communication signal's transmission power is concentrated. Signals that can interfere with such a communication channel include those transmitted on adjacent channels (adjacent channel interference) and those transmitted on the same channel (co-channel interference). Interference from adjacent channels is limited by the use of band-pass filters that filter out energy outside the specified frequency band.

In TDMA systems, a channel comprises, for example, a time slot in a periodic train of time slots of a carrier having a given frequency. These time slots may be organized into groups called frames. A given user's signal energy is confined to one or more of these time slots. Adjacent channel interference is limited by the use of a time gate or other synchronization element that only passes signal energy received at the proper time. Thus, with each channel being assigned a different time slot, system capacity is limited by the available time slots as well as by limitations imposed by channel reuse as described above with respect to FDMA.

With FDMA and TDMA systems (as well as hybrid FDMA/TDMA systems), one goal of system designers is to ensure that two potentially interfering signals do not occupy the same time and frequency. In contrast, Code Division Multiple Access (CDMA) allows communication signals to overlap in both time and frequency, while communication channels are defined by an encoding scheme, as discussed below. CDMA is a type of spread spectrum communication that has been around since the days of World War II. Early applications were predominantly military oriented. However, today there has been an increasing interest in using spread spectrum systems in commercial applications since spread spectrum communication can be more robust against interference, allowing more signals to occupy the same bandwidth at the same time. Examples of commercial applications include digital cellular radio, land mobile radio, and indoor and outdoor personal communication networks.

In a CDMA system, an electrical signal embodying an informational data stream (e.g., digitized voice, data, video) to be transmitted is combined with an electrical signal embodying a higher bit rate data stream known as a signature sequence, or spreading sequence, to produce a spread spectrum signal. Each bit of the signature sequence is referred to as a "chip", and the frequency of the electrical signal embodying the signature sequence is referred to as the "chip rate". The ratio of the chip rate to the frequency of the electrical signal embodying the informational data stream is generally referred to in the art as the "spreading ratio".

In an exemplary CDMA system, a spread spectrum signal may be generated by multiplying an electrical signal embodying an informational data stream and an electrical signal embodying a unique signature sequence. The information required to decode the spread spectrum signal (e.g., the unique signature sequence) may be transmitted to an intended receiver over a separate communication channel (e.g., a pilot channel or a control channel). Using this information, the intended receiver can extract the informational data stream from the spread spectrum signal, thereby establishing a communication channel with the transmitter.

In a wireless CDMA system, a plurality of spread spectrum signals may be combined at a transmitter to form a composite signal which modulates a radio frequency carrier, for example by binary phase shift keying (BPSK). In the composite signal, each of the spread spectrum signals overlaps all of the other spread spectrum signals in the time domain and the frequency domain. At an intended receiver, the composite signal is correlated with a signature sequence uniquely identifying one of the electrical signals embodying the informational data stream, such that the electrical signal embodying the desired informational data stream can be isolated and despread.

Traditionally, a signature sequence is used to spread one bit of information. Receiving the transmitted sequence or its complement indicates whether the information bit is a+1 or −1, sometimes denoted "0" or "1". The signature sequence usually comprises G chips per information bit. The signature sequence may consist of complex numbers (having real and imaginary parts), where the real and imaginary parts are used to modulate two carriers at the same frequency, but ninety degrees different in phase. The entire G-chip sequence, or its complement, is referred to as a transmitted symbol. The conventional receiver, e.g., a rake receiver, correlates the received signal with the complex conjugate of the known signature sequence to produce a correlation value. If BPSK modulation is used, only the real part of the correlation value may be computed. When a large positive correlation results, a "0" is detected; when a large negative correlation results, a "1" is detected.

The "information bits" referred to above can also be coded bits, where the code used is one or more of a block or convolutional code or an orthogonal code. Also, the signature sequence can be much longer than a single transmitted symbol, in which case a subsequence of the signature sequence may be used to spread the information bit. In many radio communication systems, the received signal includes two components: an I (in-phase) component and a Q (quadrature phase) component. This occurs because the transmitted signal has two components (e.g., quadrature phase shift keying, QPSK), and/or the intervening channel or lack of coherent carrier reference causes the transmitted signal to be divided into I and Q components. In a typical receiver using digital signal processing, the received I and Q component signals are sampled and stored at least every $T_c$ seconds, where $T_c$ is the duration of a chip.

In a multipath environment, a transmitted signal (e.g., a composite signal) follows several propagation paths from a transmitter to a receiver, typically as a result of the signal reflecting from one or more objects such as, for example, buildings, before arriving at the receiver. Since the several propagation paths are of unequal lengths, several copies of the transmitted signal may arrive at the receiver with different phases and time delays. The time lapse between the receipt of the first copy of the received signal and the final copy of the received signal is referred to as the delay spread of a channel. The number of resolvable paths for a particular carrier is a function of the delay spread of the channel and the chip duration for the spreading sequence. Hence, the number of resolvable paths for a particular carrier is proportional to the bandwidth of the transmitted signal.

A rake receiver provides a form of diversity combining by collecting the signal energy from the various received signal paths. Multipath diversity derives from the redundant communication paths in that when some paths fade, communication is still possible over non-fading paths. Thus, to provide multipath diversity, it is generally desirable for a modulated carrier to have sufficient bandwidth to support multiple paths. However, if a carrier supports too many paths, interference between copies of the transmitted signal traveling different propagation paths may result in degradation in performance of the rake receiver which may offset the gain obtained from diversity combining. This is particularly true in a multi-user environment due to the increase in interference levels.

Many existing cellular CDMA implementations utilize a single carrier to transmit the encoded information sequences. As discussed above, single carrier DS-SS CDMA systems commonly use orthogonal spreading codes in at least the forward link, i.e., the channel from a base station to a remote terminal. Each user is assigned one code from the set of orthogonal spreading codes. Assuming the channels are not affected by multipath fading, or are flat fading channels, signals from all CDMA users will remain orthogonal. Hence, the signal is not degraded by self interference or multiple access interference from other CDMA users. However, in channels subject to multipath fading, the orthogonality of the spreading codes may be lost because the reflected signals may lose their orthogonality. If the bandwidth of the carrier is large, such that the carrier supports a large number of paths, this may cause a single carrier DS-SS system to suffer from high self interference and multiple access interference.

Multiple carrier (MC) DS-SS CDMA systems segment the available frequency spectrum into a number of narrower-bandwidth modulated carriers. Thus, each carrier is subject to less frequency selective fading and supports fewer resolvable paths. This reduces both the self interference and the multiple access interference for communication channels in the forward link of a CDMA system. Multipath diversity, which is normally provided by using a rake receiver, may be replaced by frequency diversity. Also, a sufficient degree of multipath diversity is obtained by relatively few paths. DS-SS MC CDMA systems may utilize multiple carriers in the forward link while utilizing a single carrier in the reverse link.

An existing architecture for DS-SS MC CDMA signal design is illustrated in FIG. 1. In general, and referring to FIG. 1, an electrical signal embodying an informational data stream to be transmitted, which may comprise a serial stream of bits, each of which is T seconds long, is de-multiplexed into N parallel branches using de-multiplexer 20. Each data bit is then spread by a respective spreading sequence that has G chips and is N×T seconds long. Each spread data bit modulates S respective carriers in modulators 21 according to a modulation scheme such as BPSK, QPSK or another convenient scheme. All S×N=M carriers are then combined by a suitable device such as, for example, summer 22 and transmitted as a composite signal. Other CDMA techniques described in the literature can be considered a special case of the above, where N or S may take the value 1.

As discussed above, in cellular DS-SS MC CDMA communication systems users are allocated different channels (e.g. spreading codes). Because different users may be located at different geographic positions with respect to a base station, the different channels may be characterized by different delay spreads $T_d$. Additionally, because individual users may move relative to a base station during the course of a call, a user's connection may have different delay spreads at different points in time during the call. Hence, various users may require a different number of carriers, M, such that each carrier provides a desired number of paths, L, to support multipath diversity. At the same time, the number of paths per carrier, L, should not be so large that self-interference and multi-access interference are too large. Known DS-SS MC CDMA signal design techniques essentially perform a pre-decided assignment of a fixed number of carriers of the MC CDMA signal regardless of the channel conditions. Thus, existing signal design techniques do not provide the ability to select a desired number of carriers to allocate to a particular signal based upon a characteristic of the communication channel.

Accordingly, there is a need in the art for improved systems and methods for designing and configuring DS-SS MC CDMA signals.

SUMMARY OF THE INVENTION

The present invention addresses these and other problems by providing systems and methods for selectively allocating a number of carriers to transmit a DS-SS MC CDMA signal based upon a characteristic of a radio communication channel assigned to carry the signal. The present invention uses new signal design techniques to allocate a desired number of carriers for a signal based upon characteristics of the channel over which the signal is to be transmitted. In one embodiment, the invention selectively allocates a number of carriers to a signal based upon the delay spread associated with the selected channel. The number of carriers allocated to a signal may be selected to improve a performance parameter of the network. For example, given a fixed total bandwidth, the number of carriers allocated to a signal, and hence, the bandwidth of each carrier, may be selected to provide a desired number of paths on each carrier transmitting the signal. In another embodiment, the invention selectively allocates a number of carriers to a signal based upon a desired class of service for an information stream to be transmitted on the channel. Preferably, when the signal carries a multitude of information streams, such as multimedia systems, information streams that require a higher class of service are allocated a greater number of carriers.

In one aspect, the invention provides a method of processing a communication signal. The method comprises the steps of determining a desired number of paths for a selected channel, and allocating at least one carrier to the communication signal that corresponds to the desired number of paths. A desired number of paths may be determined by referencing a memory location associated with the communication system that contains information indicative of a desired number of paths for the selected channel. Using an estimate of the delay spread associated with the selected channel, the number of carriers can be decided.

In another aspect, the invention provides a method of generating a communication signal. The method comprises estimating a selected channel's delay spread, determining a desired number of paths per carrier for the selected channel based, at least in part, on the selected channel's delay spread, and allocating at least one carrier to the signal that corresponds to the desired number of paths.

In another aspect, the invention provides a method of generating a communication signal. The method comprises determining a characteristic of a selected channel, and, based upon the characteristic of the selected channel, allocating a number of carriers to the communication signal.

In another aspect, the invention provides a system for processing a communication signal in a communications system in which user communications are assigned to a selected active channel. The system comprises a determining circuit for generating a first signal representative of a desired number of paths for said selected active channel of said communications system, and an allocating circuit for generating a second signal representative of at least one carrier allocated to said communication signal in response to said first signal.

DETAILED DESCRIPTION OF THE INVENTION

In the following description, for purposes of explanation and not limitation, specific details are set forth, such as particular circuits, circuit components, techniques, etc., in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Systems and methods for coding CDMA communication signals are described in the following documents, the disclosures of which are incorporated by reference: U.S. Pat. No. 5,151,919 to Dent; No. 5,237,586 to Bottomley; No. 5,353,352 to Dent, et al.; No. 5,550,809 to Bottomley et al.; and No. 5,768,307 to Schramm, et al. The present invention provides an improved DS-SS MC CDMA communication system. More particularly, given a fixed total signal bandwidth, the present invention provides methods for selectively allocating a number of carriers to a DS-SS MC CDMA signal in response to a characteristic of the channel on which the signal is transmitted. In one aspect, the invention enables a DS-SS MC CDMA communication system selectively to allocate a number of carriers to a signal based on the delay spread of a selected channel. Accordingly, the system may allocate a number of carriers such that a performance aspect of the communication system, such as the bit error rate, is improved. For example, the system may allocate a number of carriers calculated to obtain a desired number of paths per carrier for the selected channel. In another aspect, the invention enables a DS-SS MC CDMA communication system to vary the number of carriers on each output branch of the de-multiplexer. Accordingly, the system may assign a number of carriers based upon desired performance parameters of different classes of data to be transmitted. Further aspects of the invention are explained in greater detail in the following text and with reference to the attached figures.

Figure 2:
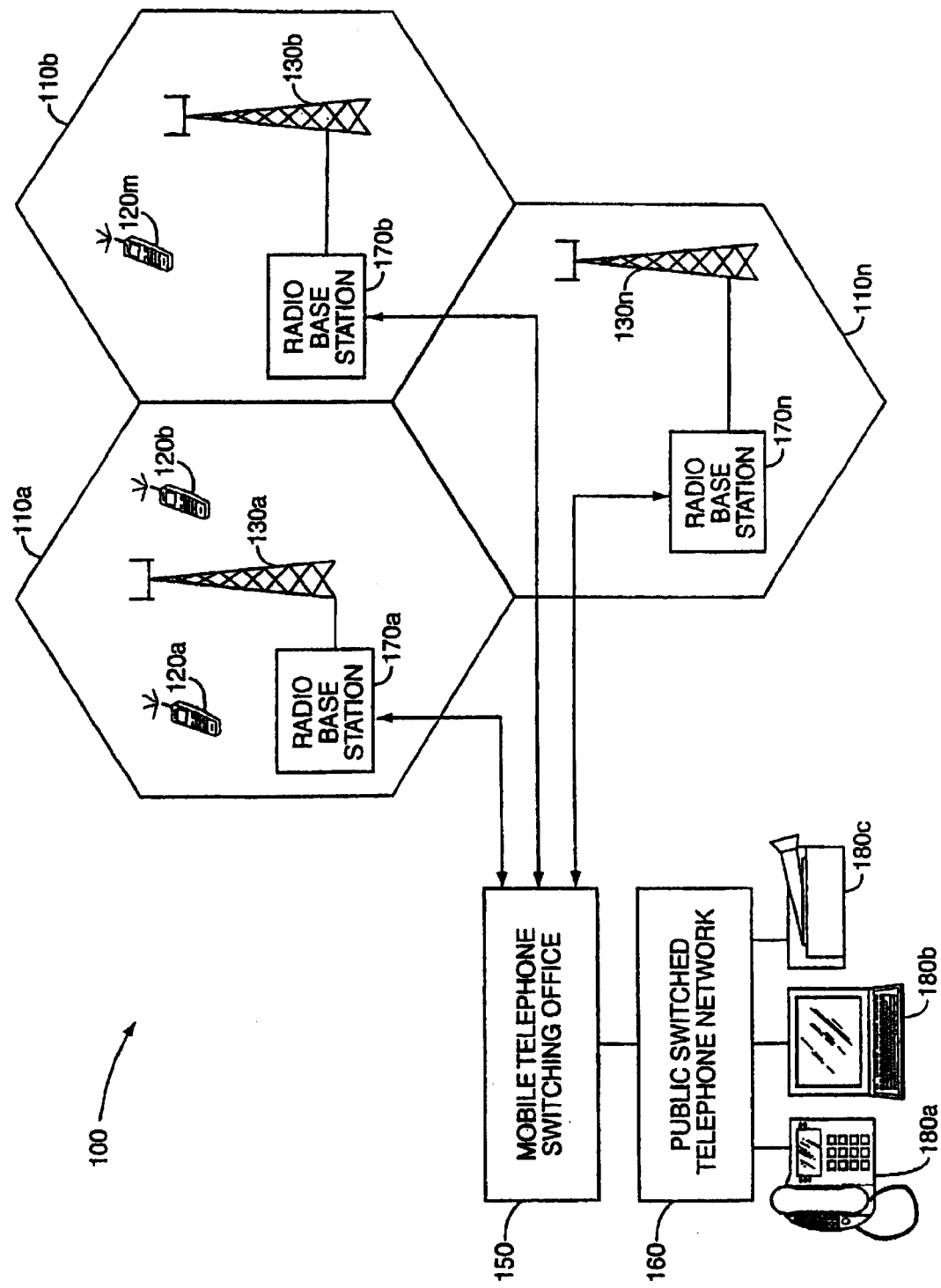
FIG. 2 illustrates a cellular communication network according to an aspect of the present invention.

An exemplary cellular radio communication system 100 is illustrated in FIG. 2. As shown in FIG. 2, a geographic region served by the system 100 is subdivided into a number of smaller regions of radio coverage known as cells 110a–n, each cell having associated with it a respective radio base station 170a–n. Each radio base station 170a–n has associated with it transmit and receive radio antennas 130a–n. Note that the use of hexagonal-shaped cells 110a–n is employed as a graphically convenient way of illustrating areas of radio coverage associated with a particular base station 170a–n. In actuality, cells 110a–n may be irregularly shaped, overlapping, and not necessarily contiguous, and the "borders" between cells can move as transmitted power levels and propagation conditions change. Each cell 110a–n may be further subdivided into sectors according to known methods. Distributed within cells 110a–n are a plurality of remote terminals 120a–m. In practical systems the number of remote terminals is much greater than the number of cells. Base stations 170a–n comprise a plurality of base station transmitters and base station receivers (not shown) that provide two-way radio communication with remote terminals 120a–m located within their respective cells. As illustrated in FIG. 2, base stations 170a–n are coupled to a mobile telephone switching office (MTSO) 150 which provides a connection to a public switched telephone network (PSTN) 160 and thenceforth to communication devices 180a–c. The cellular concept is known to those skilled in the art and, therefore, is not further described here.

According to the present invention, radio communication between the base stations 170a–170n and the remote terminals 120a–120m is effected using DS-SS CDMA. Consistent with the radio communication arts, this disclosure may use the terms downlink, forward link, or forward channel interchangeably to refer to the radio transmission of information bearing signals from base stations 170a–n to remote terminals 120a–m. Similarly, the terms uplink, reverse link, or reverse channel may be used interchangeably to refer to the transmission of information bearing signals from remote terminals 120a–m to base stations 170a–n. For the purposes of the present disclosure, it will be assumed that the forward link is a DS-SS MC CDMA link and the reverse link is a single carrier DS-SS CDMA link. It will be appreciated that the present invention is equally applicable to either a forward link or a reverse link.

Figure 3:
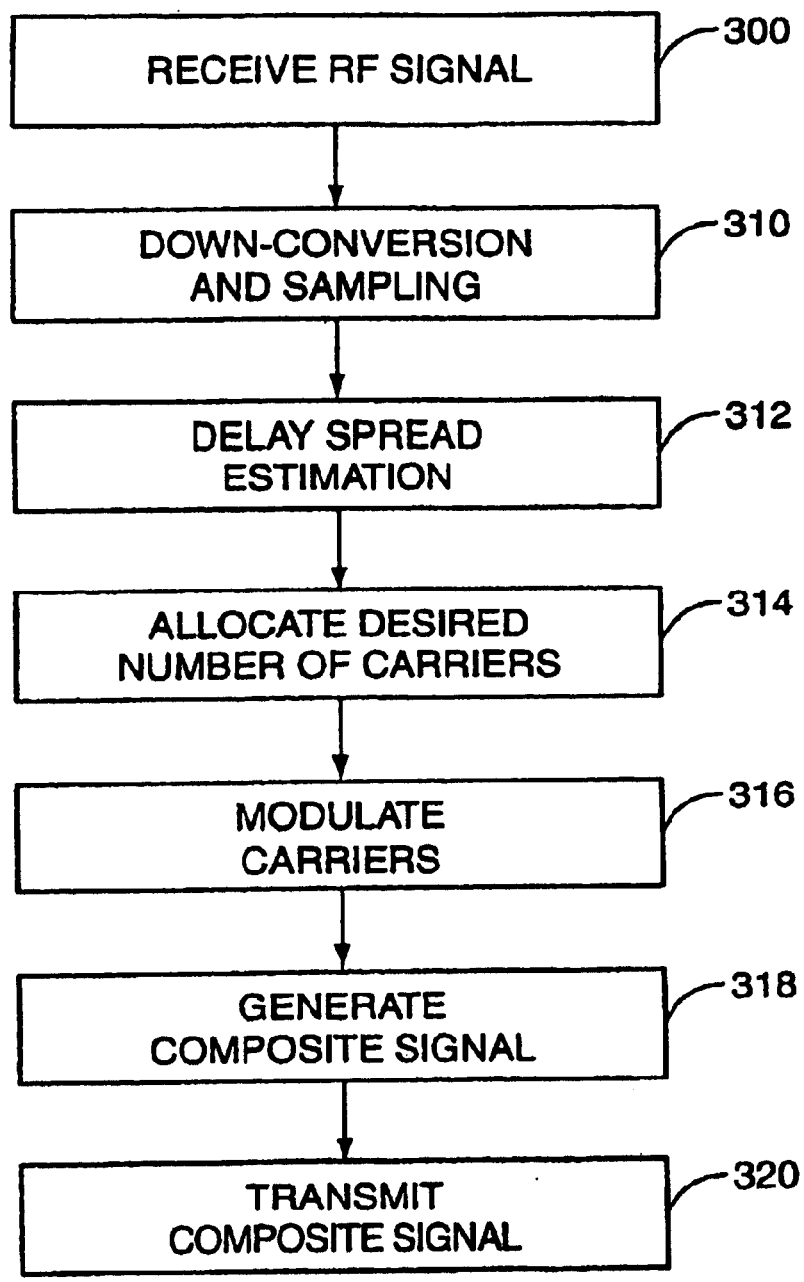
FIG. 3 is a block diagram illustrating a signal design process according to another aspect of the present invention.

FIG. 3 presents a schematic illustration of a method according to the invention for configuring a DS-SS MC CDMA communication signal. The method illustrated in FIG. 3 may be implemented in a processor associated with either a remote terminal or a base station. In a DS-SS MC CDMA system as depicted in FIG. 2, the method is implemented in a processor associated with a base station 170. The method will be explained in the context of a base station communicating with a single remote terminal. However, it will be appreciated that in practice each base station communicates with a plurality of remote terminals.

Referring to FIG. 3, in brief overview, the method according to the invention proceeds according to the following steps. At step 300, a base station receives a radio frequency (RF) signal from a remote terminal (e.g., over the reverse channel). The remote terminal may comprise a mobile phone, a personal digital assistant, or other communication device. At step 310, the RF signal received from the remote terminal is down-converted and digitally sampled, and at step 312, the delay spread associated with the reverse channel is estimated. It will be appreciated that the down-conversion and sampling processes may be combined, as in a direct conversion receiver. The ratio of the delay spread to the chip-rate is used to determine a desirable number of carriers for the signal to be transmitted to the remote terminal (e.g. the forward channel) in a manner that is described in more detail below. At step 314, a number of DS-SS carriers is allocated to the signal to be transmitted on the forward channel. At step 316, the allocated DS-SS carriers are modulated with the information stream to be transmitted. At step 318, the modulated carriers are combined to generate a composite signal. At step 320, the composite signal is transmitted.

It will be appreciated that most or all of steps 310–320 may be performed by logic instructions (e.g., a logic circuit) associated with a suitable network element such as, for example, the base station, a mobile switching center, or on a remote terminal. By way of example, and not by limitation, a network element may include a determining circuit for generating a first signal representative of a desired number of paths for a selected active channel, as described in connection with step 312. The network element may also include an allocating circuit for generating, in response to the first signal, a second signal representative of at least one carrier allocated to the communication signal. The logic instructions may form portions of a discrete logic circuit, and may be embodied in programmed instructions operating on a general purpose processor or as a programmable logic array. Alternatively, the logic instructions may form portions of an analog circuit. This process is discussed in greater detail in the following paragraphs.

Step 300, receiving an RF signal, may be performed pursuant to existing techniques. In the context of the system 100 depicted in FIG. 2, an RF signal from the remote terminal may be a communication signal (e.g., voice, data or video information) transmitted during the course of a communication session between base station 170 and remote terminal 120. Alternatively, the RF signal received from the remote terminal may be a test signal transmitted across a separate channel (e.g. a pilot channel or a control channel). In step 310, the RF signal received from the remote terminal is down-converted to baseband and sampled. Down conversion and sampling also may be performed according to any number of existing techniques known to those skilled in the art of signal processing.

Step 312, estimating the delay spread of the channel between remote terminal 120 and base station 170, may also be performed according to any number of existing signal processing techniques. A suitable technique for determining channel delay spread at a remote terminal (e.g., remote terminal 120) is disclosed in U.S. patent application Ser. No. 09/096,960 entitled PILOT STRENGTH MEASUREMENT AND MULTIPATH DELAY SEARCHER FOR CDMA RECEIVER, the disclosure of which is incorporated herein by reference in its entirety. One of ordinary skill in the art will appreciate that these techniques may readily be adapted for use in a base station rather than a remote terminal. It will be further appreciated by those skilled in the art that these techniques may readily be adapted for in a signal generator. Alternatively, a channel delay spread measurement taken at a remote terminal may simply be reported to a base station.

Step 314, allocating a number of carriers to a signal for transmission, is performed according to the present invention. The invention will be explained with reference to a communication channel between a transmitter and a single remote terminal. However, it will be appreciated that a transmitter typically maintains communication channels with a plurality of remote terminals. In one embodiment of the invention, a number of carriers is allocated to the signal for transmission to achieve a desired number of paths per carrier in the forward channel to the remote terminal. Allocating the carriers relies on the following relationships. Given a fixed total bandwidth for the DS-SS MC signal, the chip rate on each carrier is inversely proportional to the number of carriers. For example, in a cdma2000 system, a DS-SS MC CDMA forward link signal can use one carrier with chip rate of 3.6864 M chip/sec, or 3 carriers with chip rates of 1.2288 M chip/sec each. In principle, it is not necessary for the chip rates of all the carriers to be the same. Since the chip duration, $T_c$, is the inverse of the chip rate, the chip duration of the DS-SS MC signal $$T_{cM} = MT_{c1}$$

with M carriers is given by

In this relationship, $T_{cM}$ represents the chip duration for each of M carriers in a DS-SS MC signal and $T_{c1}$ is the chip duration for a single carrier DS-SS signal of the same total bandwidth. If the channel delay spread is $T_d$ and the chip duration per carrier is $T_{cM}$, the number of resolvable paths per carrier can be approximated by $$L = 1 + \left\lfloor \frac{T_d}{T_{cM}} \right\rfloor$$

$$= 1 + \left\lfloor \frac{T_d}{MT_{c1}} \right\rfloor$$

where the notation $\lfloor \chi \rfloor$ is the integer part of $\chi$.

As discussed above, the chip duration $T_{c1}$ is known. Using the channel delay spread $T_d$ obtained from step 312, the signal processor may determine a number of carriers M that results in a desired number of paths per carrier L for the selected channel. Determination of a desired number of paths per carrier L may be accomplished using a number of guidelines and may be limited by parameters of the signal configuration. The desired number of paths per carrier L preferably should be adequately large to provide multipath diversity to the signal, yet small enough to limit the effects of self interference and co-channel interference. In practice, it has been determined that providing three to four resolvable paths per carrier is adequate to ensure multipath diversity.

Assume, for example, that the forward link of the system illustrated in FIG. 2 uses a DS-SS MC CDMA signal having a total bandwidth of 5 MHz and is configured consistent with the cdma2000 specification cited above. In this system N is equal to 1 or 3, while $S_i=1$ for all i. Thus, it will be noted that this system cannot obtain frequency diversity because each bit is transmitted on one carrier only. Further, the signal configuration restricts the number of carriers M to 1 or 3. Given these constraints, applying the guideline that no more than three or four paths per carrier are desired to achieve multipath diversity enables an appropriate selection of M based upon the delay spread of a selected channel. Noting that in this system $T_{c1}=0.271$ μs, if a selected channel has a delay spread $T_d=4$ μs then allocating M=3 carriers results in L=5 paths per carrier. Note that assigning M=1 carrier would have resulted in 15 paths per carrier, increasing multipath interference. If, by contrast, the selected channel has a delay spread $T_d=0.5$ μs an appropriate value is M=1, which results in 2 paths per carrier. Allocating M=3 carriers would have resulted in carriers that support a single path for this particular channel. Accordingly, multipath diversity could not be achieved. In general, given $T_d$, M is selected from the allowed values to achieve L that achieves best compromise between multipath diversity and multipath interference.

Figure 1:
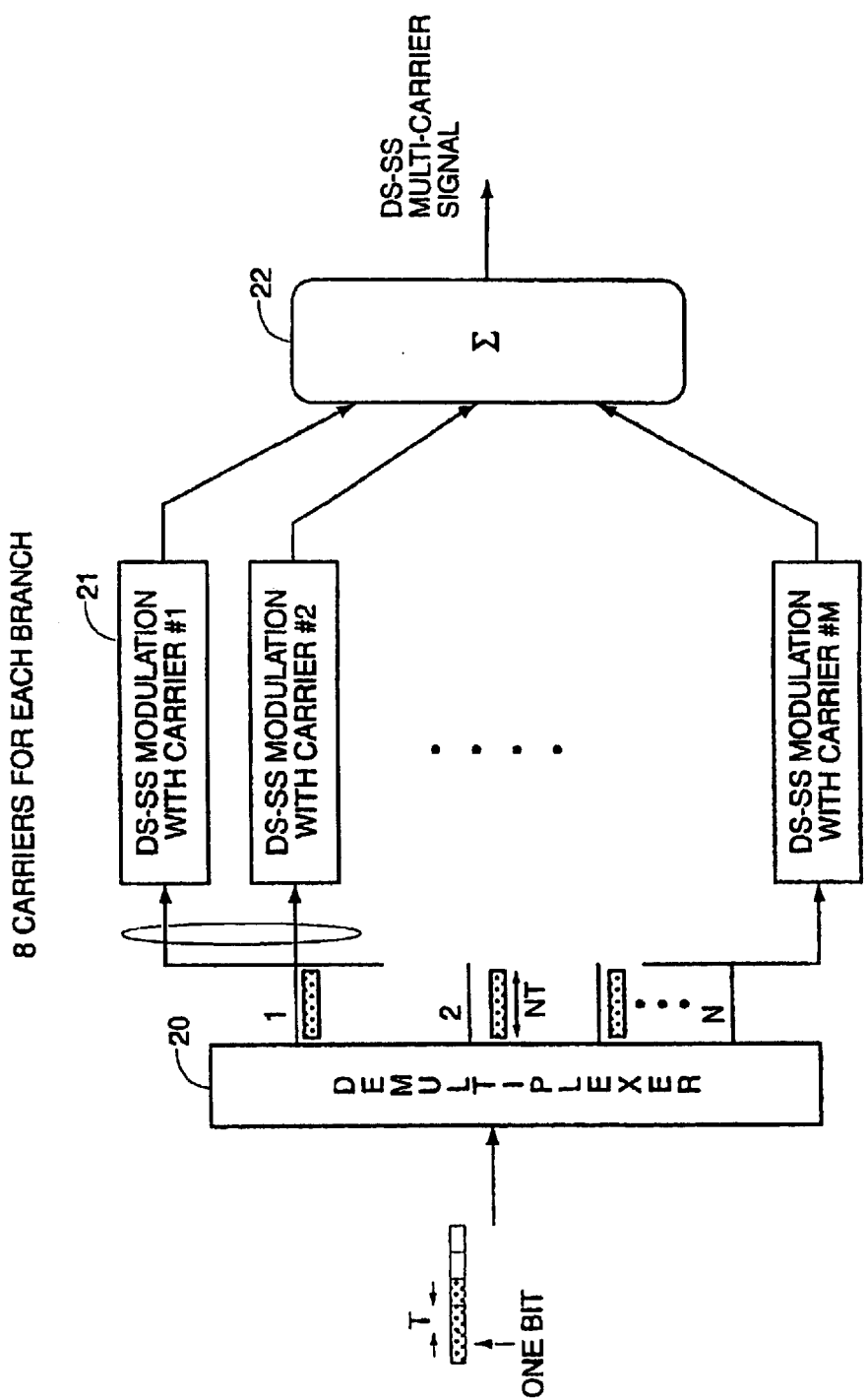
FIG. 1 is a block diagram illustrating a known architecture for a DS-SS MC CDMA communication signal.

Also, if multipath diversity cannot be obtained because, for example, the delay spread of the signal is less than the chip duration, it may be desirable to use multiple carriers to implement frequency diversity as a proxy for multipath diversity. By way of example, assume a DS-SS MC CDMA signal configuration similar to the one shown in FIG. 1, with N=1. To obtain frequency diversity, it is desirable to have enough carriers ($S_1$=M) such that the number of paths per carrier L=1. In this case, frequency diversity is maintained since the same bit is transmitted on all carriers. With L=1 and orthogonal codes, there is no multipath or multi-user interference. If there are not enough carriers to reach the condition of L=1, then the maximum number of carriers is used to minimize the number of paths L and hence minimize multipath and multi-user interference. Diversity is obtained through frequency diversity instead of multipath diversity.

The invention contemplates determining a desired number of carriers in real time, or near real time, using a measured delay spread $T_d$ associated with a selected channel. The invention further contemplates generating one or more data tables that correlate channel delay spreads $T_d$ with the required number of carriers to obtain a desired number of paths per carrier L for a given chip duration $T_{c1}$. These data tables may be stored in a suitable memory associated with the base station. One of ordinary skill in the art will recognize various mathematical variations on this storage structure, such as, for example, correlating the ratio of the channel delay spread $T_d$ to the chip duration $T_{c1}$ with the required number of carriers to obtain a desired number of paths. In this embodiment, the signal processor simply refers to the precomputed memory table to determine a desired number of carriers.

In step 316, the desired number of carriers M are modulated with the information stream, and in step 318, the carriers are combined to form a composite signal for transmission. In step 320, the composite signal is transmitted. Each of these steps may be performed in a manner consistent with known techniques.

It will be noted that in some cases, as for example in the cdma2000 system, the choices for M and N are limited. If such a system operates in an environment where the delay spread is known to be within a small range over the entire service area, then the value of M can be fixed for all users in this service area. For example, if the 5 MHz bandwidth cdma2000 system operates in an indoor environment, the delay spread is known to be less than 1 μs. In this case, M can be fixed to 1 to provide L≈3, and there is no need to estimate the delay spread for each individual CDMA user in step 312.

Figure 5:
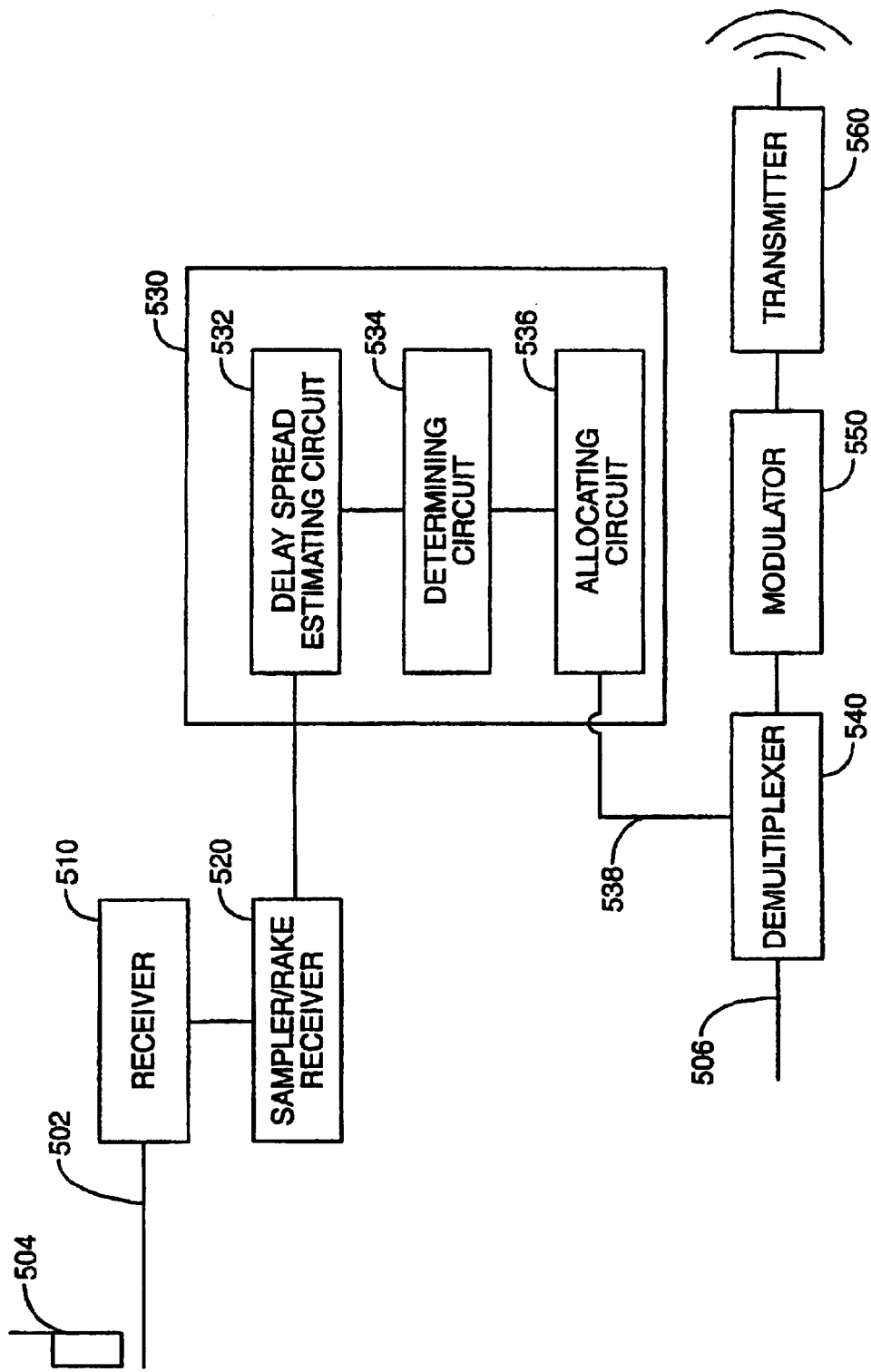
FIG. 5 is a schematic depiction of a network element adapted according to an aspect of the present invention.

FIG. 5 is a schematic depiction of a network element adapted according to an aspect of the present invention. Preferably, the invention is implemented in a network element that transmits a communication signal on multiple carriers, e.g., a multi-carrier transmitter. For purposes of brevity, FIG. 5 only depicts elements of the network element that are relevant to the present invention. Referring to FIG. 5, a receiver 510 receives a communication signal 502 from a remote terminal 504. A communication channel between remote terminal and receiver 510 may be a TDMA, FDMA, or a CDMA channel. Communication signal 502 is directed to a sampler and rake receiver 520. A signal processor module 530 is connected to sampler and rake receiver 520. Signal processor module 530 includes a delay spread estimating circuit 532 that receives input from the sampler and rake receiver 520 and estimates the delay spread associated with the communication channel associated with the received communication signal. The delay spread estimate is forwarded to a determining circuit 534, which uses the procedures discussed herein to determine a desired number of paths for the communication signal that is to be transmitted back to the remote terminal 504. Determining circuit 534 generates a first signal representative of a desired number of paths for the channel and forwards the signal to allocating circuit 536, which generates a second signal representative of at least one carrier allocated to said communication signal in response to the first signal. The output of allocating circuit 536 (e.g., the second signal) is transmitted across line 538 to demultiplexer 540, which, in response to the second signal, multiplexes a communication signal 506 into a desired number of outputs. The outputs are directed to modulator 550, where they can be modulated onto separate carrier waves and transmitted by transmitter 560. In this manner, the invention selects a desired number of carriers for a transmitted signal in response to the delay spread of a communication channel between remote terminal 502 and receiver 510.

According to a second aspect of the present invention, the system may assign a number of carriers (M) to a particular channel based upon a Quality of Service (QoS) requirement associated with the channel. In many cases, the data to be transmitted consists of classes of bits that require different QoS and, hence, different performance requirements. By way of example, Asynchronous Transfer Mode (ATM) protocols provide for QoS parameters associated with service requests. According to the invention, the signal may be configured to assign the number of carriers as a function of the quality of service requirements. An encoded information stream associated with a selected channel is analyzed. The desired number of carriers for the selected channel is then determined based upon Quality of Service requirements associated with the information stream.

Figure 4:
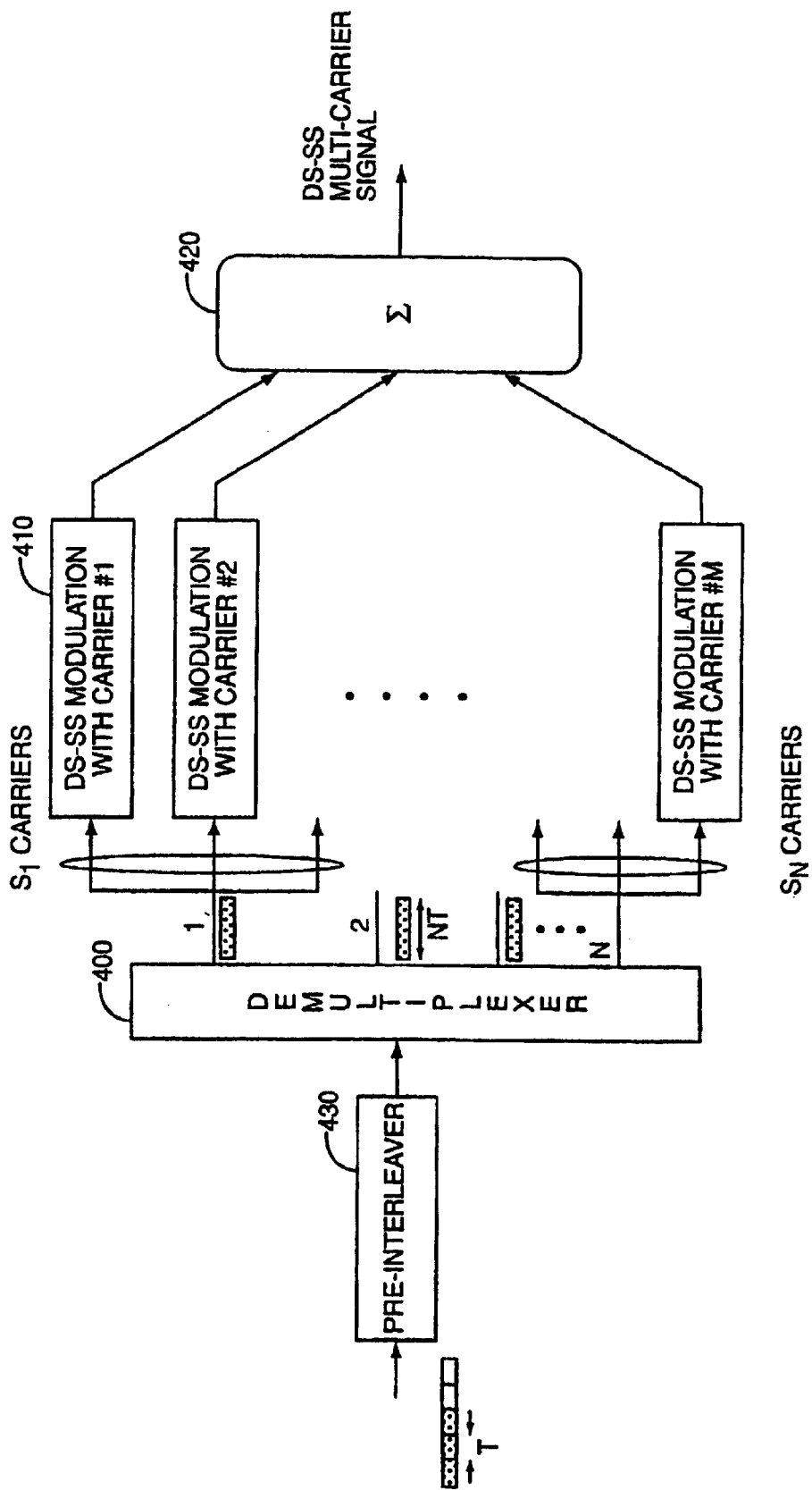
FIG. 4 is a block diagram illustrating an architecture for a DS-SS MC CDMA communication system according to yet another aspect of the present invention.

FIG. 4 illustrates an architecture for DS-SS MC CDMA signal generator according to the invention. Referring to FIG. 4, an information stream to be transmitted may be pre-interleaved an analyzing circuit including a pre-interleaver 430 such that each of the N outputs of the de-multiplexer block 400 corresponds to a different class of QoS. Each branch may then be transmitted using a different number of carriers 410 $S_i$ (i=1, 2, ..., N). Data bits that require higher performance (e.g., better QoS) can be transmitted using a larger number of carriers. The total number of carriers 410 is $$M = \sum \frac{N}{i} = 1 Si.$$

Assigning a higher number of carriers 410 to higher QoS service classes allocates network resources in a manner that is consistent with the QoS demands placed on the network.

Having allocated a number of carriers 410 to the various channels using pre-interleaver 430, the remainder of the signal configuration for the signal generator proceeds in a substantially similar fashion as discussed in connection with FIG. 4. After being de-multiplexed into parallel data streams, the information streams are tapped into parallel branches and DS-SS demodulated using S carriers, where the number of carriers may be variable. The signals are then combined and transmitted as a composite signal. It will be appreciated by those skilled in the art that the determining circuit described above with respect to FIG. 5 and the analyzing circuit may form portions of a discrete logic circuit. The discrete logic circuit may comprise a processor or a programmable logic array. The determining circuit and the analyzing circuit may thus comprise an algorithm programmed within the processor or the programmable logic array. It will be further appreciated by those skilled in the art that the determining circuit and the analyzing circuit may form portions of an analog circuit.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method of processing a communication signal, comprising:
   determining a desired number of paths for a selected channel; and
   allocating, to the communication signal, a number of carriers corresponding to the desired number of paths.

2. The method according to claim 1, wherein:
   determining a desired number of paths for a selected channel includes referencing a memory location associated with a communication system that contains information indicative of a desired number of paths for the selected channel.

3. The method according to claim 1, wherein:
   determining a desired number of paths for a selected channel includes estimating a delay spread associated with the selected channel.

4. The method according to claim 3, wherein:
   estimating a delay spread associated with the selected channel is performed at a remote terminal.

5. The method according to claim 4, wherein:
   the desired number of paths is determined as a function of the delay spread, the number of carriers, and a chip duration.

6. The method according to claim 1, further comprising:
   modulating the allocated number of carriers with an information stream.

7. The method according to claim 6, further comprising:
   combining the allocated number of carriers into a composite signal.

8. The method according to claim 7, further comprising:
   transmitting the composite signal.

9. A method of processing a communication signal, comprising:
   estimating a selected channel's delay spread;
   determining a desired number of paths for the selected channel based, at least in part, on the selected channel's delay spread; and
   allocating, to the signal, a number of carriers corresponding to the desired number of paths.

10. A method of processing a communication signal, comprising:
    determining a characteristic of a selected channel; and
    allocating a number of carriers to the communication signal based upon the characteristic of the selected channel.

11. The method according to claim 10, wherein:
    determining a characteristic of a selected channel comprises determining the channel delay spread associated with the selected channel.

12. The method according to claim 10, wherein:
    determining a characteristic of a selected channel comprises determining the Quality of Service requirements associated with an information stream to be transmitted on the selected channel.

13. A method of processing a communication signal, comprising:
    analyzing an information stream associated with a selected channel; and
    determining a desired a number of carriers for the selected channel based upon Quality of Service requirements associated with the information stream.

14. The method according to claim 13, wherein:
    the number of carriers allocated to a selected channel is proportional to the quality of service requirements associated with the information stream assigned to the channel.

15. A system for processing a communication signal in a communications system in which user communications are assigned to a selected active channel, comprising:
    a determining circuit generating a first signal representative of a desired number of paths for said selected active channel of said communications system; and
    an allocating circuit generating a second signal representative of a number of carriers allocated to said communication signal in response to said first signal.

16. The system of claim 15, wherein said determining circuit and said allocating circuit form portions of a discrete logic circuit.

17. The system of claim 16, wherein said discrete logic circuit comprises a processor and wherein said determining circuit and said allocating circuit comprise an algorithm programmed within said processor.

18. The system of claim 16, wherein said discrete logic circuit comprises a programmable logic array.

19. They system of claim 15, wherein said determining circuit and said allocating circuit form portions of an analog circuit.

20. The system of claim 15, further comprising:
    an estimating circuit estimating the delay spread associated with a selected channel.

21. A signal generator for a communication system in which user communications are assigned to channels, comprising:
    an analyzing circuit analyzing an encoded information stream associated with a selected channel; and
    a determining circuit determining a desired number of carriers for the selected channel based upon Quality of Service requirements associated with the information stream.

22. The signal generator of claim 21, wherein said determining circuit and said analyzing circuit form portions of a discrete logic circuit.

23. The signal generator of claim 22, wherein said discrete logic circuit comprises a processor and wherein said determining circuit and said analyzing circuit comprise an algorithm programmed within said processor.

24. The signal generator of claim 22, wherein said discrete logic circuit comprises a programmable logic array.

25. The signal generator of claim 21, wherein said determining circuit and said analyzing circuit form portions of an analog circuit.

26. A base station for use in a communication system in which user communications are assigned to channels, comprising:
    a demultiplexer demultiplexing an information stream;
    a determining circuit determining a characteristic of a selected channel;

an allocating circuit allocating a number of carriers to the signal based upon the characteristics of the selected channel;

a modulator modulating the allocated carriers with the information stream;

a summer adding the allocated carriers to form a composite signal; and a transmitter transmitting the composite signal.

* * * * *